(12) United States Patent
Yang

(10) Patent No.: US 6,179,024 B1
(45) Date of Patent: Jan. 30, 2001

(54) WORK PIECE ADJUSTABLE SUPPORT

(76) Inventor: Mai Yang, No. 104, Lane 145, Song Ju Road, Bei Tun Chu, Taichung 406 (TW)

( * ) Notice: Under 35 U.S.C. 154(b), the term of this patent shall be extended for 0 days.

(21) Appl. No.: 09/472,621

(22) Filed: Dec. 27, 1999

(51) Int. Cl.⁷ ..................................................... B25H 1/00
(52) U.S. Cl. .................. 144/287; 181/181.1; 181/181.4; 181/181.6; 193/35 R; 269/289 MR
(58) Field of Search ............................. 144/287; 182/129, 182/181.1, 181.6, 186.4; 248/397; 269/289 MR; 193/35 R, 35 C

(56) References Cited

U.S. PATENT DOCUMENTS

| | | | |
|---|---|---|---|
| 5,247,976 | * 9/1993 | Matthews | 144/287 |
| 5,299,656 | * 4/1994 | Grill | 269/289 MR |
| 5,337,875 | * 8/1994 | Lee | 269/289 MR |
| 5,487,445 | * 1/1996 | Biehl | 269/289 MR |

* cited by examiner

*Primary Examiner*—W. Donald Bray
(74) *Attorney, Agent, or Firm*—Charles E. Baxley

(57) ABSTRACT

A work piece support includes a base having a tube, a rod slidably received in and adjustable relative to the tube, and a supporting member disposed on the rod for supporting work pieces. A stay is pivotally secured to the tube and folded and extendible relative to the tube. The supporting member includes a frame secured on top of the rod for supporting a roller and a casing selectively and pivotally secured to the frame for supporting one or more balls. A pinion is rotatably secured to the tube and engaged with the rod for moving the rod relative to the tube.

9 Claims, 4 Drawing Sheets

WORK PIECE ADJUSTABLE SUPPORT

BACKGROUND OF THE INVENTION

1. Field of the Invention

The present invention relates to a support, and more particularly to an adjustable support for supporting work pieces of a machine.

2. Description of the Prior Art

Typically, work pieces are required to be sent and fed into the working machines. The typical work piece supports are provided beside the machines for supporting and/or for feeding the work pieces into the machines. The typical work piece supports comprise a fixed configuration that may not be adjusted according to the machines of various sizes.

The present invention has arisen to mitigate and/or obviate the afore-described disadvantages of the conventional work piece supports.

SUMMARY OF THE INVENTION

The primary objective of the present invention is to provide a work piece adjustable support which may be adjusted to various heights according to the machines of different sizes.

In accordance with one aspect of the invention, there is provided a work piece support comprising a base including a tube, a rod slidably received in the tube and adjustable relative to the tube, a supporting member provided on the rod for supporting work pieces, and means for adjusting the rod relative to the tube.

The base includes a stay pivotally secured to the tube at a pivot shaft and rotatable to engage with the tube at a folded position. The tube includes at least one bar secured thereto, the stay includes a middle portion pivotally secured to the bar at the pivot shaft and includes an upper end engageable with the tube. The tube includes a bracket secured thereto, the bar includes a bent end engaged into the bracket and secured to the tube.

The supporting member includes a frame secured on top of the rod, a roller rotatably secured in the frame at a pivot axle. The rod includes a hub provided on top thereof, the frame includes a sleeve extended downward therefrom and engaged onto the hub for securing the frame to the rod.

The supporting member further includes a casing pivotally secured to the frame at the pivot axle, means for selectively securing the casing to the frame, and at least one ball secured on the casing for selectively supporting the work pieces. The casing includes at least one socket provided therein for receiving the ball.

The adjusting means includes a rack provided in the rod, a pinion rotatably secured to the tube and engaged with the rack of the rod, and means for rotating the pinion to move the rod relative to the tube. The tube includes an oblong hole formed therein and aligned with the rack of the rod, the rotating means includes a housing secured to the tube, a work gear rotatably secured in the housing and engaged with the pinion, and a handle secured to the worm gear for rotating the pinion via the worm gear.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
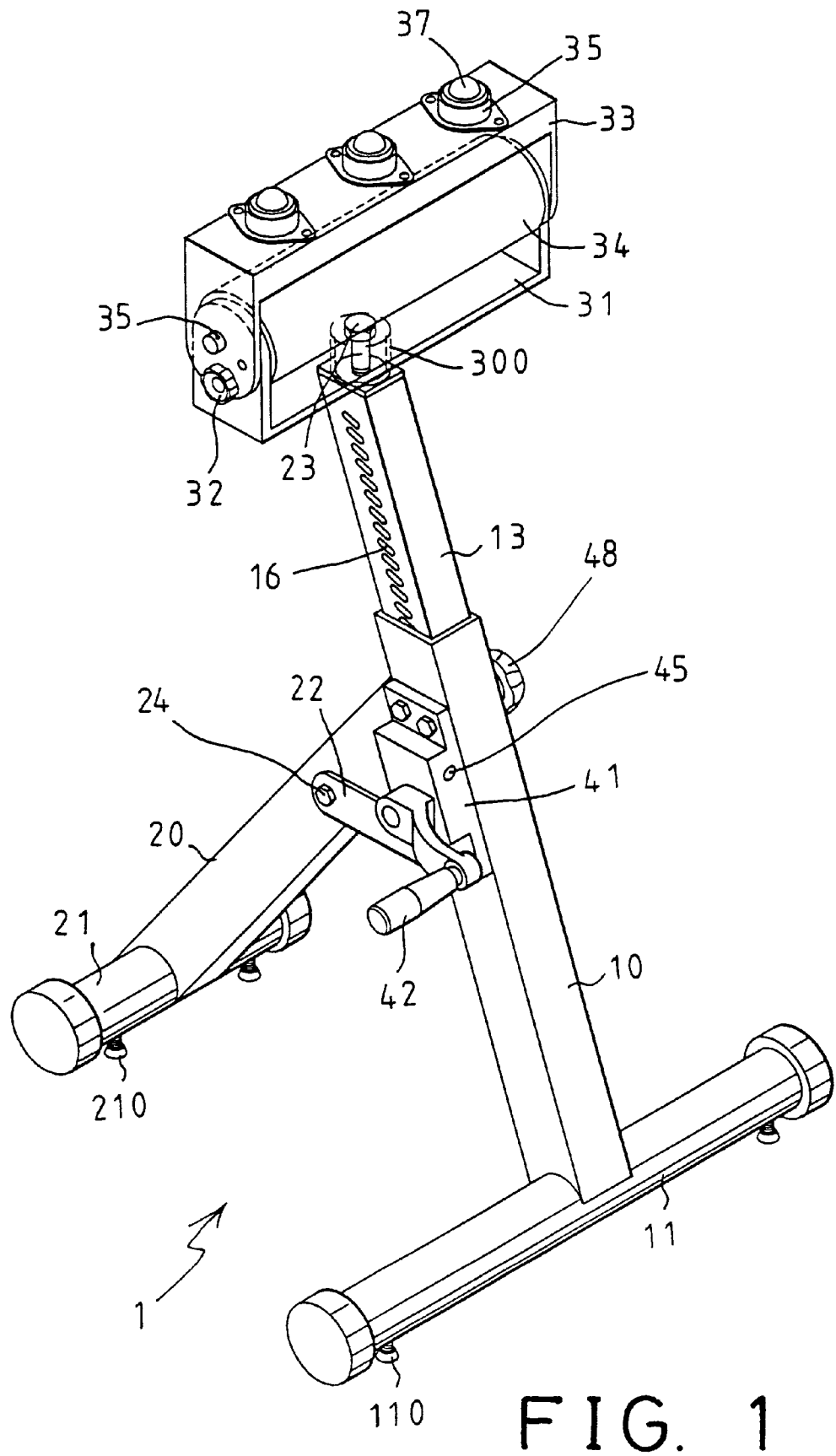
FIG. 1 is a perspective view of a work piece support in accordance with the present invention.
Figure 2:
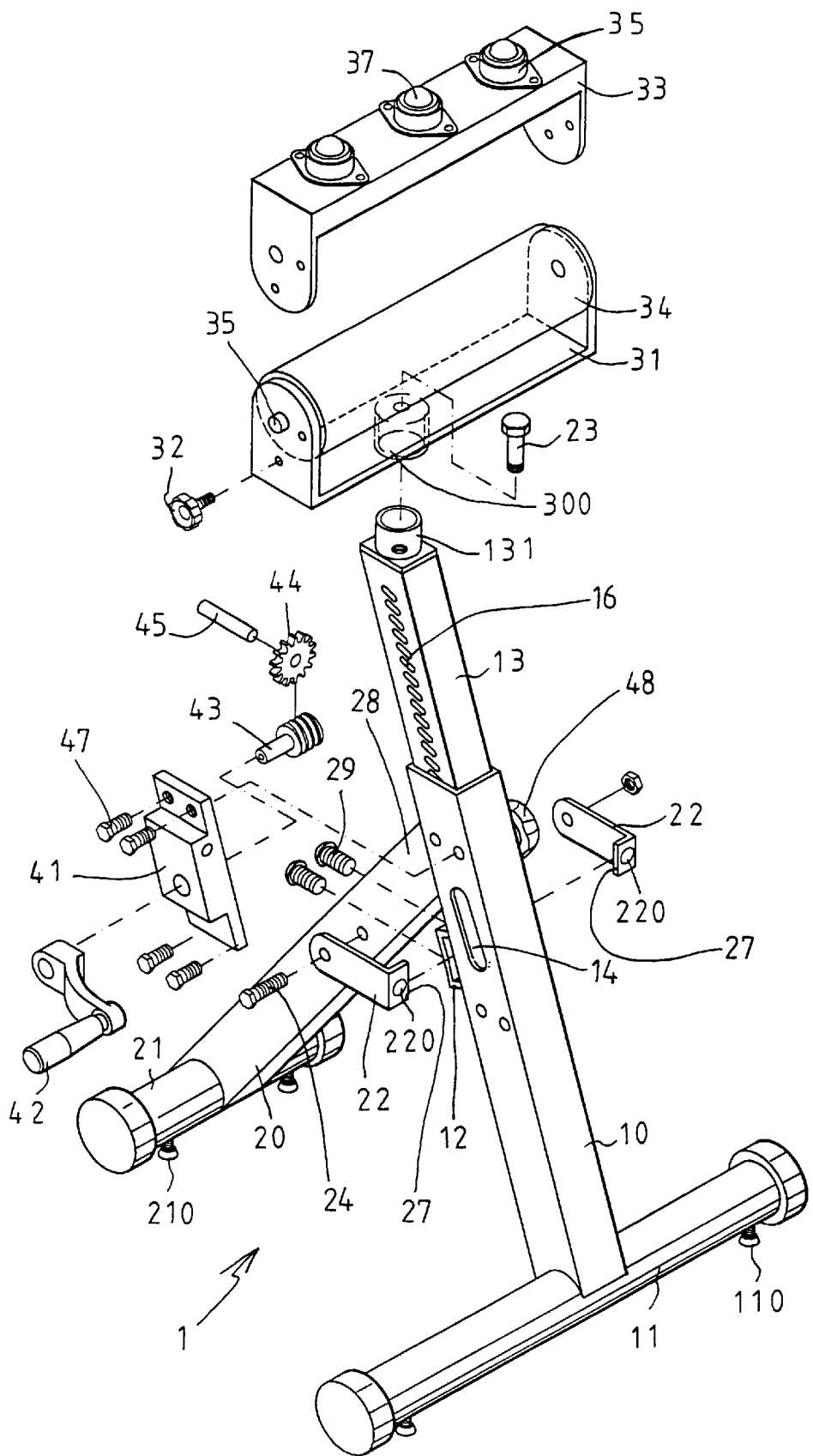
FIG. 2 is an exploded view of the work piece support.
Figure 4:
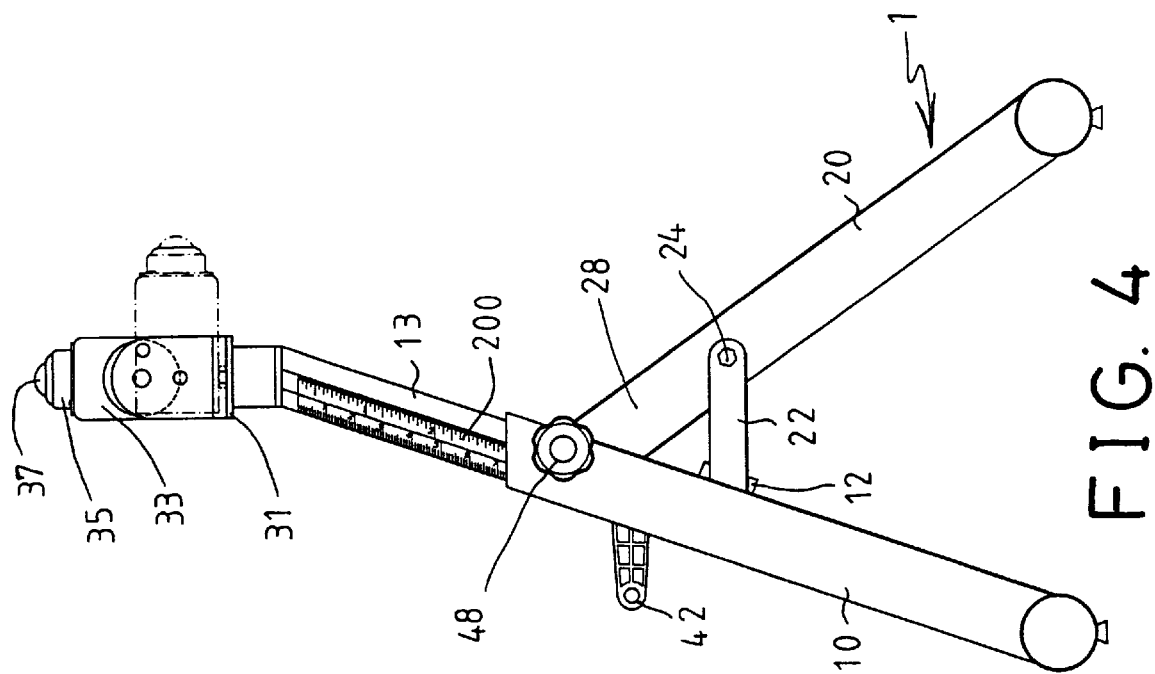
FIGS. 3 and 4 are the left side view and the right side view of the work piece support respectively.
Figure 3:
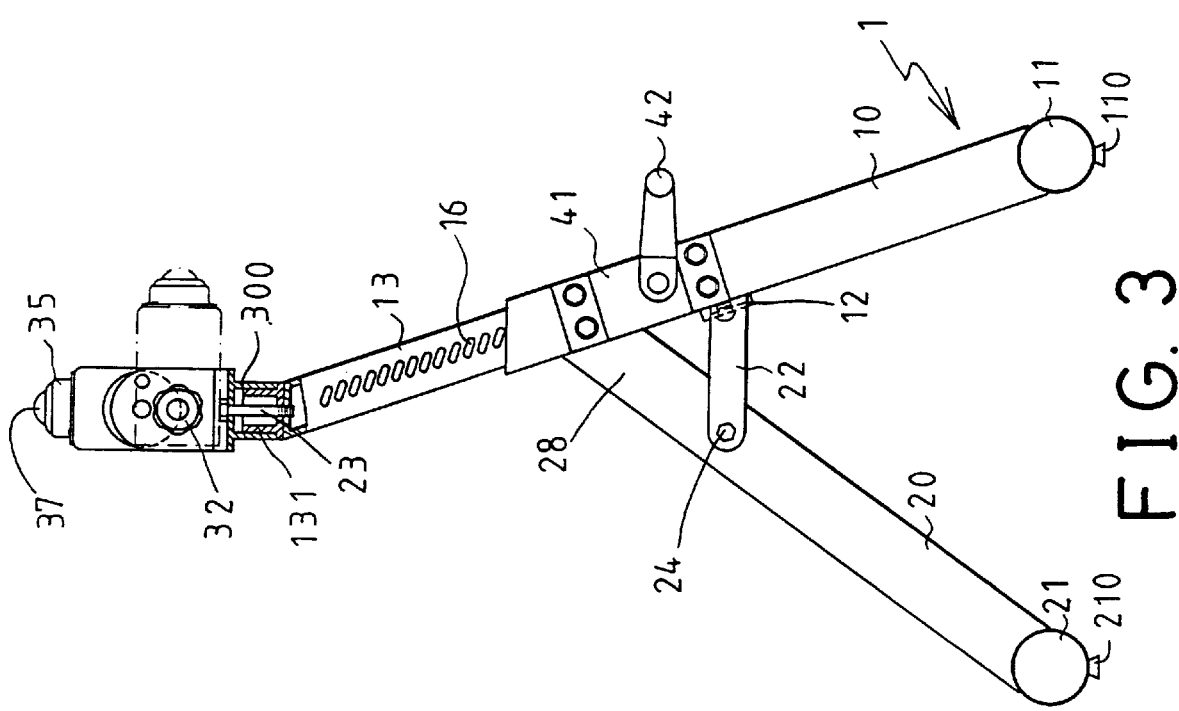

Referring to the drawings, and initially to FIGS. 1–4, a work piece support in accordance with the present invention comprises a base 1 including a tube 10 having a beam 11 laterally secured to the bottom thereof and having a bracket 12 secured to the upper portion thereof and having an oblong hole 14 formed in the upper portion thereof. One or two bars 22 each includes a hole 220 formed in a bent end 27 thereof which is engaged into the bracket 12 and secured to the tube 10 with fasteners 29. The base 1 includes a stay 20 having a middle or upper portion pivotally secured to the bracket(s) 12 at a pivot shaft (24) formed by one or more fasteners 24 for pivotally securing the stay 20 to the tube 10 at the pivot shaft 24 and for allowing the stay 20 to be folded to engage with the tube 10 at the folding position. The stay 20 also includes a beam 21 laterally secured to the bottom thereof. It is preferable that the beams 11, 21 each includes one or more pads 110, 210 secured to the bottom portion thereof. The stay 20 includes an upper end 28 for engaging with the tube 10 and for supporting the base 1 at the open position as shown in FIGS. 1–5.

Figure 5:
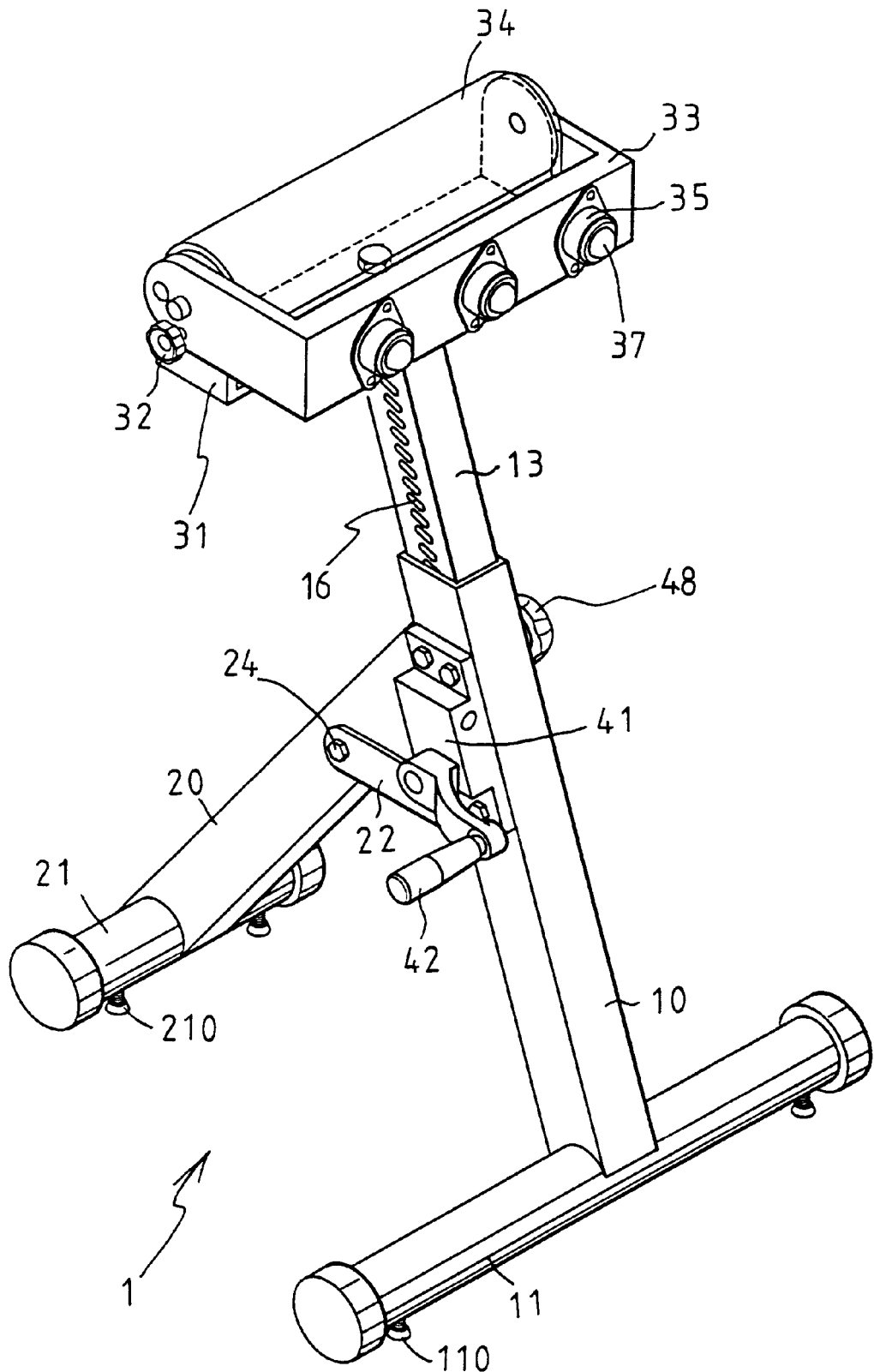
FIG. 5 is a perspective view illustrating the operation of the work piece support.

A rod 13 is slidably received in the tube 10 and extendible and retractable relative to the tube 10. The rod 13 includes a rack 16 or includes a number of teeth or notches or recesses (16) formed in one of the side portions thereof and aligned with the oblong hole 14 of the tube 10, and includes a graduation 200 formed on the other side portion thereof (FIG. 4), and includes a hub 131 disposed on top thereof. A frame 31 includes a sleeve 300 secured to the bottom thereof and engaged onto the hub 131 of the rod 13 and secured to the rod 13 withe one or more fasteners 23. A supporting member, such as a roller 34, is rotatably secured in the frame 31 at a pivot axle 35 for supporting the work pieces. A casing 33 is pivotally secured to the frame 31 at the pivot axle 35 and adjustably secured to the frame 31 with a fastener 32 which may secure the casing 33 to the frame 31 at least at the upward extending position as shown in FIG. 1 and as shown in solid lines in FIGS. 3 and 4 and/or at the lateral position as shown in FIG. 5 and as shown in dotted lines in FIGS. 3 and 4. One or more sockets 35 are secured on the casing 33 for receiving balls 37 therein which may also be used to selectively support the work pieces.

A housing 41 is secured to the tube 10 with one or more fasteners 47. A pinion 44 is rotatably secured in the housing 41 at a pivot pin 45 and engaged with the teeth or the recesses 16 of the rod 13. A worm or a worm gear 43 is rotatably received in the housing 41 and engaged with the pinion 44. A handle 42 is secured to the work gear 43 for rotating the worm gear 43 to rotate the pinion 44 and to move and to adjust the rod 13 up and down along the tube 10. A fastener 48 may further be provided for securing the rod 13 to the tube 10 at the selected relative position.

In operation, as shown in FIG. 5, when the casing 33 is rotated downward, the roller 34 may be exposed for supporting the work pieces. When the casing 33 is rotated upward and secured to the frame 31 at the upward extending position, the balls 37 of the casing 33 may be selectively used for supporting the work pieces.

Accordingly, the work piece adjustable support in accordance with the present invention may be adjusted to various heights according to the machines of different sizes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A work piece support comprising:
   a base including a tube, said base including a stay pivotally secured to said tube at a pivot shaft and rotatable to engage with said tube,
   a rod slidably received in said tube and adjustable relative to said tube,
   a supporting member provided on said rod for supporting work pieces, and
   means for adjusting said rod relative to said tube.

2. The work piece support according to claim 1, wherein said tube includes at least one bar secured thereto, said stay includes a middle portion pivotally secured to said at least one bar at said pivot shaft and includes an upper end engageable with said tube.

3. The work piece support according to claim 2, wherein said tube includes a bracket secured thereto, said at least one bar includes a bent end engaged into said bracket and secured to said tube.

4. The work piece support according to claim 1, wherein said supporting member includes a frame secured on top of said rod, a roller rotatably secured in said frame at a pivot axle.

5. The work piece support according to claim 4, wherein said rod includes a hub provided on top thereof, said frame includes a sleeve extended downward therefrom and engaged onto said hub for securing said frame to said rod.

6. The work piece support according to claim 4, wherein said supporting member further includes a casing pivotally secured to said frame at said pivot axle, means for selectively securing said casing to said frame, and at least one ball secured on said casing for selectively supporting the work pieces.

7. The work piece support according to claim 6, wherein said casing includes at least one socket provided therein for receiving said at least one ball.

8. The work piece support according to claim 1, wherein said adjusting means includes a rack provided in said rod, a pinion rotatably secured to said tube and engaged with said rack of said rod, and means for rotating said pinion to move said rod relative to said tube.

9. The work piece support according to claim 8, wherein said tube includes an oblong hole formed therein and aligned with said rack of said rod, said rotating means includes a housing secured to said tube, a work gear rotatably secured in said housing and engaged with said pinion, and a handle secured to said worm gear for rotating said pinion via said worm gear.

* * * * *